United States Patent [19]

Sakoda

[11] Patent Number: 5,376,258

[45] Date of Patent: Dec. 27, 1994

[54] PROCESS FOR HYDROGENATING TREATMENT OF HEAVY HYDROCARBON OIL

[75] Inventor: Yukihiro Sakoda, Sodegaura, Japan

[73] Assignee: Idemitsu Kosan Co., Ltd., Tokyo, Japan

[21] Appl. No.: 119,069

[22] PCT Filed: Feb. 19, 1993

[86] PCT No.: PCT/JP93/00203

§ 371 Date: Sep. 16, 1993

§ 102(e) Date: Sep. 16, 1993

[87] PCT Pub. No.: WO93/17082

PCT Pub. Date: Feb. 9, 1993

[30] Foreign Application Priority Data

Feb. 21, 1992 [JP] Japan .................. 4-034874

[51] Int. Cl.$^5$ .................. C10G 45/00; C10G 47/18
[52] U.S. Cl. .................. 208/57; 208/97; 208/107; 208/111; 208/216 R; 208/216 PP; 208/217
[58] Field of Search .................. 208/57, 111, 135, 136, 208/137, 210, 216 R, 216 PP, 217, 97, 89, 107; 502/74, 210, 211, 254; 423/328

[56] References Cited

U.S. PATENT DOCUMENTS

| | | | |
|---|---|---|---|
| 3,050,459 | 8/1962 | Schuman | 208/97 |
| 3,472,759 | 4/1967 | Masologites et al. | 208/59 |
| 3,686,093 | 2/1971 | Irvine | 208/57 |
| 3,716,476 | 2/1973 | Coons et al. | 208/97 |
| 4,446,008 | 1/1994 | Shimakawa et al. | 208/111 |
| 4,511,458 | 4/1985 | Billon et al. | |
| 5,141,737 | 8/1992 | Iwamoto et al. | 423/328 |

FOREIGN PATENT DOCUMENTS

| | | |
|---|---|---|
| 0113283 | 7/1984 | European Pat. Off. |
| 0384186 | 8/1990 | European Pat. Off. |
| 0537500 | 4/1993 | European Pat. Off. |
| 47-12979 | 6/1972 | Japan . |
| 47-33103 | 11/1972 | Japan . |
| 47-44001 | 11/1972 | Japan . |
| 54-23096 | 2/1979 | Japan . |
| 58-112049 | 7/1983 | Japan . |
| 2-289419 | 11/1990 | Japan . |
| 1584706 | 2/1981 | United Kingdom . |
| 2073770 | 10/1981 | United Kingdom . |

Primary Examiner—Helen M. S. Sneed
Assistant Examiner—Bekir L. Yildirim
Attorney, Agent, or Firm—Frishauf, Holtz, Goodman & Woodward

[57] ABSTRACT

There is disclosed a process for hydrogenating treatment of a heavy hydrocarbon oil comprising the successive steps of (1) hydrogenating-demetalizing treatment, (2) hydrocracking treatment and (3) hydrodesulfurizing-hydrodenitrifying treatment in the presence of respective catalysts which process comprises employing in the hydrodesulfurizing-hydrodenitrifying treatment, a catalyst having a pore size distribution restricted to a specific range as measured by nitrogen release method. According to the above-mentioned process, a product oil with a low sulfur content can be obtained in high cracking efficiency from a heavy hydrocarbon oil without equipment trouble due to sludge formation.

14 Claims, No Drawings

PROCESS FOR HYDROGENATING TREATMENT OF HEAVY HYDROCARBON OIL

TECHNICAL FIELD

The present invention relates to a process for a hydrogenating treatment of a heavy hydrocarbon oil. More particularly, it pertains to a process for a hydrogenating treatment of a heavy hydrocarbon oil which process is capable of efficiently producing a product oil with a low sulfur content in high cracking efficiency and of eliminating the trouble with petroleum refinery due to sludge deposits in the case of hydrogenating treating the heavy hydrocarbon oil to cause desulfurization, cracking and the like.

BACKGROUND ART

There is desired in the petroleum refining industry, a petroleum refining technique which is capable of producing a high-quality light petroleum oil in high yield from a low-quality heavy oil as the charge stock as one of the measures for more effectively utilizing the natural resources.

Nevertheless to the best of the present refining techniques, an attempt to enhance cracking efficiency results in deterioration of the petroleum product due to an increase in sulfur content and besides causes the trouble with petroleum refinery due to increasing sludge formation; while an attempt to suppress sulfur content leads to lowered cracking efficiency. Such being the case, there is not available a refining technique satisfying the above-mentioned requirements.

Under such circumstances, a cracking treatment technique which is capable of producing a product oil with a low sulfur content and a high cracking efficiency and is free from the formation of sludge is eagerly desired.

As the primary contributor to the trouble with petroleum refining at the time of a high degree of cracking reaction or caused by a rise in reaction temperature accompanying the deterioration of a catalyst, sludge formation in the refinery has heretofore greatly taken part therein, sometimes making the operation impossible.

A number of reports are made on the technique which suppresses the formation of sludge in the process directed to a high degree of cracking reaction. However, each of them is nothing but an abstract report failing to elucidate the working effect of the technique.

For example, Japanese Patent Application Laid-Open No. 25889/1990 discloses a two-stage process for hydrogenating a heavy petroleum oil by the use of a hydrogenation catalyst having a large pore diameter of 150 Å or larger in average which comprises the first step in which the hydrogenation is carried out at a reaction temperature of 400° C. or lower and the second step at a reaction temperature of 400° to 460° C. However, any of the working examples in the above-mentioned disclosure describes the reaction by means of an autoclave only, thus failing to elucidate the extent of decrease in the formation of sludge in a fixed-bed flow type reactor as a commercial production equipment. In addition, it never describes the quality of the hydrogenated product oil. Moreover, the above-disclosed process involves the problem that as compared with the previous direct hydrodesulfurization process, the two-stage hydrogenation process necessitates a heating furnace facility, thereby being accompanied by an increase in the process cost.

The technique disclosed in Japanese Patent Application Laid-Open No. 305891/1990 relates to a descaling agent which removes the suspended solids such as the scale contained in heavy hydrocarbon oil, a hydrogenation catalyst which removes the dissolved metals such as organometallic compounds in heavy hydrocarbon oil and the methods of using said agent and catalyst, respectively. As the specific method of using, the above-mentioned descaling agent is packed in the forefront of a reactor to prevent catalyst solidification or clogging by scale at the forefront of the reactor.

However, since the sludge that is the object of the present invention is formed on the downstream side of the reactor, the descaling agent is judged to be incapable of exerting the descaling effect.

Aside from the aforestated disclosures, the technique disclosed in Japanese Patent Application Laid-Open No. 243196/1988 relates to a process for hydrocracking a heavy oil as the charge stock by the use of a hydrogenation catalyst in the coexistence of a hydrogen-donative solvent and hydrogen gas, followed by the hydrogenation of the produced oil. According to the working examples of the disclosure, although the cracking efficiency is enhanced by the process, the sulfur content in the product oil is still high, thus deteriorating the quality of the product. It is naturally anticipated that the process running cost is raised by the use of the hydrogen-donative agent. Furthermore, the hydrogenation process does not show the effect on decrease in sludge formation, revealing itself to be not so valuable as being expected.

DISCLOSURE OF THE INVENTION

Under such circumstances, intensive research and investigation were made by the present inventors on the development of a cracking technique for a heavy hydrocarbon oil which can produce a product oil with a low sulfur content in high cracking efficiency, suppress sludge formation and eliminate operational troubles due to sludge, while overcoming the problems with the conventional processes.

As a result, it has been found by the present inventors that the above-mentioned object can be attained by the use of a catalyst having a pore size distribution restricted to a specific range in the hydrosulfurizing and hydrodenitrifying treatment as the catalyst capable of suppressing sludge formation in the case where a heavy hydrocarbon oil is successively subjected to (1) a hydrogenating-demetalizing treatment; (2) a hydrocracking treatment; and (3) a hydrodesulfurizing-hydrodenitrifying treatment. The present invention has been accomplished on the basis of the above-mentioned finding and information.

In more detail, the present invention provides a process for a hydrogenating treatment of a heavy hydrocarbon oil comprising the successive steps of (1) a hydrogenating-demetalizing treatment, (2) a hydrocracking treatment and (3) a hydrodesulfurizing-hydrodenitrifying treatment in the presence of respective catalysts which process comprises employing in the hydrosulfurizing-hydrodenitrifying treatment, a catalyst having a pore size distribution as measured by a nitrogen release method in which an average pore diameter of the pores having a diameter in the range of 16 to 1,700 Å ranges from 55 to 90 Å, the volume of the pores having said average pore diameter ±10 Å occupies at least 30% of the volume occupied by the pores having a diameter in the range of 16 to 1,700 Å and the volume of the pores having a diameter of not smaller than 101 Å occupies at most 10% of the volume occupied by the pores having a diameter in the range of 16 to 1,700 Å.

THE MOST PREFERRED EMBODIMENT TO CARRY OUT THE INVENTION

The charge stock oil as the object of the present invention includes a variety of heavy hydrocarbon oils and is exemplified by residual oil from the atmospheric distillation of crude oil, residual oil from vacuum distillation, residual oil from catalytic cracking, oil from visbreaking, tar sand oil and oil shale.

The aforesaid heavy hydrocarbon oil is subjected to the hydrogenating treatment in the presence of catalyst comprising the successive steps of (1) a hydrogenating-demetalizing treatment, (2) a hydrocracking treatment and (3) a hydrodesulfurizing-hydrodenitfifying treatment in this order.

In the (1) hydrogenating-demetalizing treatment, a heavy hydrocarbon oil is mixed with hydrogen gas and the resultant mixture is fed to and treated with a hydrogenating-demetalizing treatment equipment, which consists of a single or a plurality of reaction towers. The hydrogenating-demetalizing treatment process and the equipment therefor are exemplified by but not limited to a fixed bed, a boiling bed, a moving bed, an upflow system, a downflow system and a solvent extraction system. In the fixed-bed system, each reaction tower is divided into a plurality of catalyst beds, and a fluid for cooling the reactants is introduced therebetween.

The hydrogenating demetalizing catalyst to be employed in the case of fixed bed may be any of the commercially available demetalizing catalyst comprising at least one metal selected from the group VIA metals, the group VIII metals in the periodic table and compounds thereof (hereinafter metal and metal compound are sometimes abbreviated to "Metal") in the form of an oxide, which catalyst is supported on any of a variety of usable carriers exemplified by porous inorganic oxides such as alumina, silica, silica-alumina and sepiolite.

The treatment conditions in the hydrogenating-demetalizing treatment include a reaction temperature of 300° to 450° C. (preferably 360° to 420° C.); a hydrogen partial pressure of 30 to 200 kg/cm$^2$G, preferably 100 to 180 kg/cm$^2$G; a hydrogen/oil ratio of 300 to 2,000 Nm$^3$/kl , preferably 500 to 1,000 Nm$^3$/kl; and an LHSV (liquid hourly space velocity) of 0.1 to 10 hr$^{-1}$, preferably 0.3 to 5.0 hr$^{-1}$.

Thereafter, the effluent oil from the (1) hydrogenating-demetalizing treatment process is fed to a (2) hydrocracking treatment equipment, which consists of a single or a plurality of reaction towers. In the case of a fixed-bed system, each reaction tower is divided into a plurality of catalyst beds, and a fluid for cooling the reactants is introduced therebetween.

The catalyst to be employed in the hydrocracking treatment is that comprising at least one Metal selected from the group VIA metals and the group VIII metals in the periodic table in the form of oxide, which catalyst is supported on any of a variety of usable carriers such as alumina, silica, alumina-boria, alumina-phosphorus and zeolite. There is also usable a catalyst prepared by the techniques disclosed in Japanese Patent Publication Nos. 49131/1985, 24433/1986, 21484/1991, etc. which comprises at least one Metal selected from the group VIA metals and the group VIII metals in the periodic table in the form of oxide and which is supported on a carrier consisting of 20 to 80% by weight of an iron-containing zeolite and 80 to 20% by weight of an inorganic oxide. There is further usable a catalyst prepared by the technique disclosed in Japanese Patent Application Laid-Open No. 289419/1990 which comprises at least one Metal selected from the group VIA metals and the group VIII metals in the periodic table in the form of oxide and which is supported on a carrier consisting of 10 to 90% by weight of an iron-containing zeolite and 90 to 10% by weight of an inorganic oxide. In particular, there is preferably used as the iron-containing zeolite, an iron-containing aluminosilicate obtained by treating a steaming-treated steaming zeolite with an aqueous solution of an iron salt. (Refer to Japanese Patent Application Laid-Open No. 289419/1990.) The use of the aforesaid iron-containing aluminosilicate is extremely effective in regard to enhancing the cracking efficiency from the distillate with boiling points of not lower than 343° C. to the distillate with boiling points of not higher than 343° C.

As the group VIA metal in the periodic table, Mo and W is preferable and as the group VIII metal therein, Ni and Co are preferable.

The treatment conditions in the hydrocracking treatment include a reaction temperature of 300° to 450° C., preferably 380° to 420° C.; a hydrogen partial pressure of 30 to 200 kg/cm$^2$G, preferably 100 to 180 kg/cm$^2$G; a hydrogen/oil ratio of 300 to 2,000 Nm$^3$/kl, preferably 500 to 1,000 Nm$^3$/kl; and an LHSV of 0.1 to 2.0 hr$^{-1}$, preferably 0.2 to 1.0 hr$^{-1}$.

As the result of the above-mentioned hydrocracking treatment, a high-quality naphtha distillate and kerosene/gas-oil distillates can be obtained in high efficiency by cracking a distillate of not lower than 343° C. to a distillate of not higher than 343° C.

The effluent oil from the (2) hydrocracking treatment step preceded by the (1) hydrogenating demetalizing treatment step is fed to (3) hydrosulfurizing hydrodenitrifying treatment equipment, which consists of a single or a plurality of reaction towers. In the case of a fixed-bed system, each reaction tower is divided into a plurality of catalyst beds, and a fluid for cooling the reactants is introduced therebetween.

The catalyst to be employed in the hydrodesulfurizing and hydrodenitrifying treatment is greatly different from the conventional hydrodesulfurization catalysts that have heretofore been used in hydrodesulfurization and thus, constitutes the feature of the present invention.

Prior to investigation on the present hydrodesulfurization catalyst, the sludge forming mechanism was investigated and elucidated by the present inventors. As a result, it has been proved that asphaltene (n-heptane-insoluble and toluene-soluble component) which is one of the high molecular components in the charge stock oil is greatly changed in its primary and supermolecular structures and converted into sludge by treating the oil under severe conditions. It follows from the aforestated fact that in producing a product oil with a low sulfur content in high cracking efficiency, the sludge formation is suppressed by the application of the catalyst capable of restricting the asphaltene cracking to a more mild level which comprises at least one metal component selected from the group consisting of the group VIA metals and the group VIII metals in the periodic table, specifically exemplified by Co—Mo and Ni—Mo in the form of oxide, which catalyst is supported in an amount of 8 to 20% by weight expressed in terms of oxide on any of a variety of usable carriers such as alumina, silica, alumina-silica, alumina-boria, alumina-phosphorus, zeolite and mixtures thereof and which catalyst has a pore size distribution as measured by nitrogen release method in which an average diameter of the pores having a diameter of 16 to 1,700 Å ranges from 55 to 90 Å, the volume of the pores having said average pore diameter ±10 Å occupies at least 30% of the volume occupied by the pores having a diameter of 16 to 1,700 Å and the volume of the pores having a diameter larger than 101 Å occupies at most 10% of the volume occupied by the pores having a diameter of 16 to 1,700 Å. In particular, the use of alumina-boria or alumina-phosphorus as the carrier exhibits a remarkable effect. The alumina-boria as the carrier has preferably a boria content of 5 to 30% by weight, and the alumina-phosphorus as the carrier has preferably a phosphorus content of 1 to 10% by weight.

The above-described trouble with petroleum refinery due to sludge formation is publicly known from the various existing literatures and routine commercial operation of the refinery, and the sludge amount is quantified as toluene-insolubles.

The treatment conditions in the hydrodesulfurizing-hydrodenitrifying treatment include a reaction temperature of 300° to 450° C., preferably 360° to 420° C.; a hydrogen partial pressure of 30 to 200 kg/cm$^2$ G, preferably 100 to 180 kg/cm$^2$ G; a hydrogen/oil ratio of 300 to 2,000 Nm$^3$/kl, preferably 500 to 1,000 Nm$^3$/kl; and an LHSV of 0.1 to 2.0 hr$^{-1}$, preferably 0.1 to 0.5 hr$^{-1}$.

As the result of the above-mentioned hydrodesulfurizing hydrodenitrifying treatment, the distillate of not lower than 343° C. boiling point is improved in particular.

Moreover, the combined use of the aforestated catalyst in the (3) hydrodesulfurizing hydrodenitrifying treatment and the iron-containing aluminosilicate obtained by treating a steaming-treated zeolite with an aqueous solution of an iron salt as disclosed in the aforesaid Japanese Patent Application Laid-Open No. 289419/1990 in the (2) hydrocracking treatment enables the product oil with a low sulfur content to be produced more efficiently in high cracking efficiency without equipment trouble due to sludge formation.

In each of the treatment steps comprising the (1) hydrogenating-demetalizing treatment, (2) hydrocracking treatment and (3 hydrodesulfurizing-hydrodenitrifying treatment, a heavy hydrocarbon oil with a sulfur content of 1.0% or less by weight in the distillate of not lower than 343° C. boiling point can be obtained in a cracking efficiency of 20% or higher, preferably 20 to 70% by weight in terms of the distillate of not lower than 343° C. boiling point contained in the charge stock oil by optionally varying the inlet temperature in the range of 300° to 420° C.

The effluent oil discharged from the reaction process comprising the above (1), (2) and (3) treatments is usually introduced in a separation step according to the conventional method, where it is separated into a gas portion and a liquid portion by being treated with a plurality of separation vessels. The gas portion is subjected to the step of removing hydrogen sulfide, ammonia, etc., followed by the step of enhancing hydrogen purity, etc. and is recycled through the reaction process together with a fresh hydrogen feed gas.

On the other hand, the liquid portion which has been separated in the separation step is introduced in a distillation step, where it is distilled or separated into respective fractions according to the conventional method. Specifically, it can be separated into a naphtha fraction, a kerosene fraction, a gas oil fraction and a residuum fraction by setting the fractionating conditions under atmospheric fractionation, for example, on 145° to 190° C. for a naphtha cut temperature, 235° to 265° C. for a kerosene cut temperature, 343° to 380° C. for a gas oil cut temperature and 380° C. and higher for a residuum cut temperature. The naphtha fraction thus obtained is used as the charge stock oil for a catalytic reformer so that a reformed gasoline with a high octane value can be produced. The distillating fractionation may be carried out by vacuum distillation.

As described hereinbefore, in the hydrogenating treatment of a heavy hydrocarbon oil, a product oil with a low sulfur content can be produced in a high cracking efficiency without operational trouble, while sludge formation is suppressed by using a catalyst for hydrodesulfurizing and hydrodenitrifying treatments, the pore size distribution of which catalyst is restricted to a specific range.

Accordingly, the process according to the present invention is advantageous in that:

(1) Long-term stable operation is possible, thus curtailing running cost.

(2) It is possible to select a charge stock oil in a wide range from a light hydrocarbon oil to a heavy hydrocarbon oil.

(3) High profitability is assured by virtue of high cracking efficiency and high quality of the product.

(4) It is possible to select the cracking efficiency from low to high, thereby imparting flexibility to the process equipment constitution.

Consequently, the present invention establishes a surpassingly excellent cracking treatment technique for a heavy hydrocarbon oil from the viewpoint of effective utilization of resources, and is expected to find commercial applications.

In the following, the present invention will be described in more detail with reference to examples and comparative examples. In the examples and comparative examples, the residuum having the following properties obtained from atmospheric distillation of the Arabian heavy oil was used as the heavy hydrocarbon oil, that is, the charge stock oil.

Properties:

| | |
|---|---|
| Specific gravity | 0.9798 |
| Kinematic viscosity (at 50° C.) | 2,018 cSt |
| Sulfur content | 4.13% by weight |
| Nitrogen content | 2500 ppm |
| Vanadium content | 85 ppm |
| Nickel content | 36 ppm |
| Carbon residue | 15% by weight |
| Asphaltene | 7.7% by weight |
| Initial boiling point | 281° C. |
| Distillation range | |
| 341° C. | 5% |
| 376° C. | 10% |
| 460° C. | 30% |
| 546° C. | 50% |

EXAMPLE 1

1 ) Hydrogenation catalyst

① αHydrogenation-demetalization catalyst -alumina carrier, 1.5% by weight of molybdenum oxide, 3% by weight of nickel oxide, 3% by weight of vanadium oxide ② Hydrocracking catalyst Alumina carrier with 65% by weight of iron-containing zeolite (the carrier prepared according to Example 1 in Japanese Patent Application Laid-Open No. 289419/1990) 4% by weight of cobalt oxide, 10% by weight of molybdenum oxide.

③ Hydrodesulfurization-hydrodenitrification catalyst γ-alumina-boria carrier (2.4% by weight of boria), 8.8% by weight of molybdenum oxide, 3.4% by weight of cobalt oxide.

The catalyst had a pore distribution as measured by nitrogen release method in which an average pore diameter of the pores having 16 to 1,700 Å diameter was 85 Å, the volume of the pores having 85 ±10 Å occupied 39% of the volume occupied by the pores having 16 to 1,700 Å and the volume of the pores having a diameter of not smaller than 101 Å occupied 6% of the volume occupied by the pores having 16 to 1,700 Å diameter.

2) Hydrogenation treatment conditions

| Treatment temperature | 390 to 410° C. |
|---|---|
| Hydrogen partial pressure | 145 kg/cm²G |
| Hydrogen/oil ratio | 860 Nm³/kl |

A 1 liter fixed-bed reactor was packed with 21% by volume of the hydrogenation demetalization catalyst, 36% by volume of the hydrocracking catalyst and 43% by volume of the hydrodesulfurization hydrodenitrification catalyst each as described above, in this order and was used to treat the medium from atmospheric distillation of the Arabian heavy oil under the above-mentioned treatment conditions at a downflow rate of 314 cc/hr. The reaction temperatures in the hydrogenation-demetalization catalyst bed, hydrocracking catalyst bed and hydrodesulfurization-hydrodenitrification catalyst bed were 380° C., 405° C. and 382° C., respectively.

Comparative Example 1

The charge stock oil was subjected to hydrogenating treatment in the same manner as in Example 1 with regard to the types of the hydrogenation-demetalization catalyst and the hydrocracking catalyst and the volumetric proportion of each catalyst in combination, but the under-mentioned hydrodesulfurization-hydrodenitrification catalyst was employed.

③ Hydrodesulfurization-hydrodenitrification catalyst γ-alumina carrier, 6.9% by weight of molybdenum oxide, 1.2% by weight of cobalt oxide, 0.7% by weight of nickel oxide.

The catalyst had a pore distribution as measured by nitrogen release method in which an average pore diameter of the pores having 16 to 1,700 Å diameter was 118 Å, the volume of the pores having 118±10 Å diameter occupied 31.4% of the volume occupied by the pores having 16 to 1,700 Å diameter and the volume of the pores having a diameter of not smaller than 101 Å occupied 51% of the volume occupied by the pores having 16 to 1,700 Å diameter.

The reaction temperatures in the hydrogenation-demetalization catalyst bed, hydrocracking catalyst bed and hydrodesulfurization-hydrodenitrification catalyst bed were 380° C., 405° C. and 382° C., respectively.

EXAMPLE 2

The charge stock oil was subjected to hydrogenating treatment in the same manner as in Example 1 with regard to three types of the catalysts and volumetric proportion of each catalyst in combination.

The reaction temperatures in the hydrogenation-demetalization catalyst bed, hydrocracking catalyst bed and hydrodesulfurization-hydrodenitrification catalyst bed were 380° C., 405° C. and 392<C., respectively.

EXAMPLE 3

The charge stock oil was subjected to hydrogenating treatment in the same manner as in Example 1 with regard to the types of the hydrogenation-demetalization catalyst and the hydrocracking catalyst and the volumetric proportion of each catalyst in combination, but the under-mentioned hydrodesulfurization-hydrodenitrification catalyst was employed.

③ Hydrodesulfurization-hydrodenitrification catalyst γ-alumina-boria carrier (2.6% by weight of boria), 9.2% by weight of molybdenum oxide, 3.5% by weight of cobalt oxide.

The catalyst had a pore distribution as measured by nitrogen release method in which an average pore diameter of the pores having 16 to 1,700 Å diameter was 59 Å, the volume of the pores having 59 ±10 Å diameter occupied 50% of the volume occupied by the pores having 16 to 1,700 Å diameter and the volume of the pores having a diameter of not smaller than 101 Å occupied 2.2% of the volume occupied by the pores having 16 to 1,700 Å diameter.

The reaction temperatures in the hydrogenation-demetalization catalyst bed, hydrocracking catalyst bed and hydrodesulfurization-hydrodenitrification catalyst bed were 380° C., 405° C. and 392° C., respectively.

EXAMPLE 4

The charge stock oil was subjected to hydrogenating treatment in the same manner as in Example 1 with regard to the types of the hydrogenation-demetalization catalyst and the hydrocracking catalyst and the volumetric proportion of each catalyst in combination, but the under-mentioned hydrodesulfurization-hydrodenitrification catalyst was employed.

③ Hydrodesulfurization-hydrodenitrification catalyst γ-alumina-phosphorus carrier (2.1% by weight of phosphorus), 9.3% by weight of molybdenum oxide, 3.6% by weight of cobalt oxide.

The catalyst had a pore distribution as measured by nitrogen release method in which an average pore diameter of the pores having 16 to 1,700 Å diameter was 83 Å, the volume of the pores having 83 ±10 Å diameter occupied 37% of the volume occupied by the pores having 16 to 1,700 Å diameter and the volume of the pores having a diameter of not smaller than 101 Å occupied 7% of the volume occupied by the pores having 16 to 1,700 Å diameter.

The reaction temperatures in the hydrogenation-demetalization catalyst bed, hydrocracking catalyst bed and hydrodesulfurization-hydrodenitrification catalyst bed were 380° C., 405° C. and 392° C., respectively.

Comparative Example 2

The charge stock oil was subjected to hydrogenating treatment in the same manner as in Comparative Example 1 with regard to three types of the catalyst and volumetric proportion of each catalyst in combination.

The reaction temperatures in the hydrogenation-demetalization catalyst bed, hydrocracking catalyst bed and hydrodesulfurization-hydrodenitrification catalyst bed were 380° C., 405° C. and 392° C., respectively.

Comparative Example 3

The charge stock oil was subjected to hydrogenating treatment in the same manner as in Example 1 with regard to the types of the hydrogenation-demetalization catalyst and the hydrocracking catalyst and the volumetric proportion of each catalyst in combination, but the under-mentioned hydrodesulfurization-hydrodenitrification catalyst was employed.

③ Hydrodesulfurization-hydrodenitrification catalyst γ-alumina-boria carrier (2.2% by weight of boria), 8.6% by weight of molybdenum oxide, 3.3% by weight of cobalt oxide.

The catalyst had a pore distribution as measured by nitrogen release method in which an average pore diameter of the pores having 16 to 1,700 Å diameter was 110 Å, the volume of the pores having 110±10 Å diameter occupied 11.3% of the volume occupied by the pores having 16 to 1,700 Å diameter and the volume of the pores having a diameter of not smaller than 101 Å occupied 47% of the volume occupied by the pores having 16 to 1,700 Å diameter.

The reaction temperatures in the hydrogenation-demetalization catalyst bed, hydrocracking catalyst bed and hydrodesulfurization-hydrodenitrification catalyst bed were 380° C., 405° C. and 392° C., respectively.

To evaluate the performance of the product oil obtained in each of the examples and comparative examples, measurements were made of toluene-insoluble portion, sulfur content and cracking efficiency of the fraction with a boiling point of 343° C. or higher for each of the product oils. The results are given in Table 1.

Comparative Example 4

The charge stock oil was subjected to hydrogenating treatment in the same manner as in Example 1 with regard to the types of the hydrogenation-demetalization catalyst and the hydrocracking catalyst and the volumetric proportion of each catalyst in combination, but the under-mentioned hydrodesulfurization-hydrodenitrification catalyst was employed.

③ Hydrodesulfurization-hydrodenitrification catalyst γ-alumina-phosphorus carrier (2.2% by weight of phosphorus), 8.7% by weight of molybdenum oxide, 3.2% by weight of cobalt oxide.

The catalyst had a pore distribution as measured by nitrogen release method in which an average pore diameter of the pores having 16 to 1,700 Å diameter was 105 Å, the volume of the pores having 105±10 Å diameter occupied 10.5% of the volume occupied by the pores having 16 to 1,700 Å diameter and the volume of the pores having a diameter of not smaller than 101 Å occupied 45% of the volume occupied by the pores having 16 to 1,700 Å diameter.

The reaction temperatures in the hydrogenation-demetalization catalyst bed, hydrocracking catalyst bed and hydrodesulfurization-hydrodenitrification catalyst bed were 380° C., 405° C. and 392° C., respectively.

To evaluate the performance of the product oil obtained in each of the examples and comparative examples, measurements were made of toluene-insoluble portion, sulfur content and cracking efficiency of the fraction with a boiling point of 343° C. or higher for each of the product oil. The results are given in Table 1.

TABLE 1

| | Toluene-insoluble rate (% by weight) | Cracking efficiency of fraction with ≧343° C. boiling points (% by weight) | Sulfur content in product oil (% by weight) |
|---|---|---|---|
| Example 1 | ≦0.005 | 63.8 | 0.100 |
| Comparative Example 1 | 0.01 | 62.1 | 0.173 |
| Example 2 | ≦0.005 | 64.5 | 0.090 |
| Example 3 | ≦0.005 | 63.5 | 0.100 |
| Example 4 | ≦0.005 | 64.0 | 0.092 |
| Comparative Example 2 | 0.017 | 61.6 | 0.140 |
| Comparative Example 3 | 0.020 | 63.1 | 0.100 |
| Comparative Example 4 | 0.019 | 62.0 | 0.130 |

In the present invention, cracking efficiency and product oil are defined as follows, respectively, and were measured by the method described hereunder.

The term "cracking efficiency" is used to quantitatively indicate the extent of conversion of an oil fraction having boiling points of not lower than 343° C. into an oil fraction having boiling points of not higher than 342° C. An oil fraction having boiling points of not lower than 343° C. is made into an oil fraction with a high value added which can be used for automobile engines, jet engines, diesel engines, etc. by being converted into an oil fraction having boiling points of not higher than 342° C. Therefore, a catalyst which causes high cracking efficiency is highly rated. The term "product oil" expresses the oil fraction having at least 5 carbon atoms which is obtained at the outlet of the last reaction tower.

1) Cracking efficiency Cracking efficiency=[% by weight of oil fraction having boiling points of not lower than 343° C. in charge stock oil-(% by weight of oil fraction having boiling points of not lower than 343° C. in product oil×liquid recovery rate)]/ % by weight of oil fraction having boiling points of not lower than 343° C.

2) Toluene-insoluble rate

An oil fraction having boiling points of not lower than 343° C. was obtained from a product oil with a vacuum distillation plant. Then, to the resultant oil fraction was added 20 times by volume of toluene with heating at 80° C. for 1 hour. Subsequently, the mixture was filtered with a filter having 1 μm pore size, the filter cake caught on the filter was weighed, and toluene-insoluble rate was calculated by the following formula Toluene insoluble rate (% by weight)=[weight of filter cake (g)/amount of charged oil fraction having boiling points of not lower than 343° C.(g)]×100

The weight of filter cake was obtained by means of a filter made to have a constant weight in advance from the difference between the weight of the filter before filtration and the weight thereof after filtration.

As can be seen from Table 1, the product oils in the examples are superior to those in the comparative examples with regard to the cracking efficiency of fraction with≧343° C. boiling points, sulfur content in product oil and especially, toluene-insoluble rate.

INDUSTRIAL APPLICABILITY

As described above, according to the hydrogenating treatment of heavy hydrocarbon oil of the present invention, a product oil with a low sulfur content can be produced in high cracking efficiency without operational trouble while sludge formation is suppressed by using a catalyst for hydrodesulfurizing and hydrodenitrifying treatment, the pore size distribution of which catalyst is restricted to a specific range.

Accordingly, the present invention establishes a surpassingly excellent cracking treatment technique for a heavy hydrocarbon oil from the viewpoint of effective utilization of resources, and is expected to find commercial applications.

I claim:

1. A process for hydrogenating a heavy hydrocarbon oil into a product oil comprising the successive steps of
   (a) hydrogenating-demetalizing a heavy hydrocarbon oil as a starting material in the presence of hydrogen and a hydrogenating-demetalizing catalyst at a reaction temperature of 300° to 450° C., a hydrogen partial pressure of 30 to 200 kg/cm$^2$G, and a hydrogen/oil ratio of 300 to 2,000 Nm$^3$/kl, to produce a hydrogenated, demetalized oil,
   (b) hydrocracking said hydrogenated, demetalized oil from step (a) in the presence of hydrogen and a hydrocracking catalyst at a reaction temperature of 300° to 450° C., a hydrogen partial pressure of 30 to 200 kg/cm$^2$G and a hydrogen/oil ratio of 300 to 2,000 Nm$^3$/kl to produce a hydrocracked oil, and
   (c) hydrodesulfurizing-hydrodenitrifying said hydrocracked oil from step (b) in the presence of hydrogen and a hydrodesulfurizing-hydrodenitrifying catalyst at a reaction temperature of 300° to 450° C., a hydrogen partial pressure of 30° to 200 kg/cm$^2$G and a hydrogen/oil ratio of 300 to 2,000 Nm$^3$/kl to produce a hydrodesulfurized-hydrodenitrified oil, said hydrodesulfuring-hydrodenitrifying catalyst having a pore size distribution as measured by a nitrogen release method in which an average pore diameter of the pores having a diameter of 16 to 1700 Å ranges from 55 to 90 Å, the volume of the pores having said average pore diameter ±10 Å occupies at least 30% of the volume occupied by the pores having a diameter of 16 to 1,700 Å and the volume of the pores having a diameter of not smaller than 101 Å occupies at most 10% of the volume occupied by the pores having a diameter of 16 to 1,700 Å.

2. The process according to claim 1 wherein the catalyst employed in the hydrocracking comprises a metal belonging to the group VIA in the periodic table and a metal belonging to the group VIII in the periodic table or a compound thereof supported on a carrier of 10 to 90% by weight of an iron-containing zeolite and 90 to 10% by weight of an inorganic oxide.

3. The process according to claim 1 wherein the catalyst employed in the hydrodesulfurizing-hydrodenitrifying comprises a metal belonging to the group VIA in the periodic table and a metal belonging to the group VIII in the periodic table in a total amount of 8 to 20% by weight expressed in terms of the metal oxide, which metals are supported on an alumina-boria carrier containing 5 to 30% by weight of boria.

4. The process according to any of the claims 1 to 3 wherein the catalyst employed in the hydrodesulfurizing-hydrodenitrifying comprises a metal belonging to the group VIA in the periodic table and a metal belonging to the group VIII in the periodic table in a total amount of 8 to 20% by weight expressed in terms of the metal oxide, which metals are supported on an alumina-phosphorus carrier containing 1 to 10% by weight of phosphorus.

5. The process according to claim 1 or 2 wherein a cracking efficiency which indicates the extent of conversion of an oil fraction having a boiling point of not lower than 343° C., is 20% by weight or higher, and the sulfur content in the product oil is 1.0% by weight or lower.

6. The process according to claim 1 wherein the hydrogenating-demetalizing is carried out at a temperature of 360° to 420° C., a hydrogen partial pressure of 100 to 180 kg/cm$^2$G, a hydrogen/oil ratio of 500 to 1,000 Nm$^3$/kl and a liquid hourly space velocity of 0.1 to 10 hr$^{-1}$; the hydrocracking is carried out at a temperature of 380° to 420° C., a hydrogen partial pressure of 100 to 180 kg/cm$^2$G, a hydrogen/oil ratio of 500 to 1,000 Nm$^3$/kl and a liquid hourly space velocity of 0.1 to 20 hr$^{-1}$; and the hydrodesulfurizing-hydrodenitrifying is carried out at a temperature of 360° to 420° C., a hydrogen partial pressure of 100 to 180 kg/cm$^2$G, a hydrogen/oil ratio of 500 to 1,000 Nm$^3$/kl and a liquid hourly space velocity of 0.1 to 2.0 hr$^{-1}$.

7. The process according to claim 6 wherein the hydrogenating-demetalizing is carried out at a liquid hourly space velocity of 0.3 to 5.0 hr$^{-1}$; the hydrocracking is carried out at a liquid hourly space velocity of 0.2 to 1.0 hr$^{-1}$; and the hydrosulfurizing-hydrodenitrifying is carried out at a liquid hourly space velocity of 0.1 to 0.5 hr$^1$.

8. The process according to claim 3 wherein the metal belonging to the group VIA in the periodic table is Mo and the metal belonging to the group VIII in the periodic table is at least one metal selected from the group consisting of Co and Ni.

9. The process according to claim 4 wherein the metal belonging to the group VIA in the periodic table is Mo and the metal belonging to the group VIII in the periodic table is at least one metal selected from the group consisting of Co and Ni.

10. The process according to claim 5 wherein the catalyst employed in the hydrodesulfurizing-hydrodenitrifying comprises a metal belonging to the group VIA in the periodic table and a metal belonging to the group VIII in the periodic table in a total amount of 8 to 20% by weight expressed in terms of the metal oxide, which metals are supported on an alumina-boria carrier containing 5 to 30% by weight of boria.

11. The process according to claim 5, wherein the catalyst employed in the hydrodesulfurizing-hydrodenitrifying comprises a metal belonging to the group VIA in the periodic table and a metal belonging to the group VIII in the periodic table in a total amount of 8 to 20% by weight expressed in terms of the metal oxide, said metals being supported on an alumina-phosphorus carrier containing 1 to 10% by weight of phosphorus.

12. The process according to claim 1 wherein the catalyst employed in the hydrogenating-demetalizing comprises at least one metal selected from a group VIA metal in the periodic table, a group VIII metal in the periodic table, and compounds thereof in the form of an oxide, said metal being supported on a porous inorganic oxide carrier selected from the group consisting of alumina, silica, silica-alumina and sepiolite.

13. The process according to claim 12, wherein the group VIA metal is Mo and the group VIII metal is Co or Ni.

14. A process for hydrogenating a heavy hydrocarbon oil comprising the successive steps of (a) hydrogenating-demetalizing a heavy hydrocarbon oil in the presence of hydrogen and a hydrogenating-demetalizing catalyst to produce a hydrogenated, demetalized oil, (b) hydrocracking the hydrogenated, demetalized oil from step (a) in the presence of hydrogen and a hydrocracking catalyst to produce a hydrocracked oil, and (c) hydrodesulfurizing-hydrodenitrifying the hydrocracked oil from step (b) in the presence of hydrogen and a hydrodesulfurizing hydrodenitrifying catalyst, said hydrodesulfurizing-hydrodenitrifying catalyst having a pore size distribution as measured by a nitrogen release method in which an average pore diameter of the pores having a diameter of 16 to 1700 Å is from 55 to 90 Å, the volume of the pores having said average pore diameter ±10 Å occupies at least 30% of the volume occupied by the pores having a diameter of 16 to 1,700 Å and the volume of the pores having a diameter of not smaller than 101 Å occupies at most 10% of the volume occupied by the pores having a diameter of 16 to 1,700 Å.

* * * * *